May 20, 1958  R. B. PARKER, JR  2,835,341
FILTER CONSTRUCTION
Filed Oct. 25, 1954
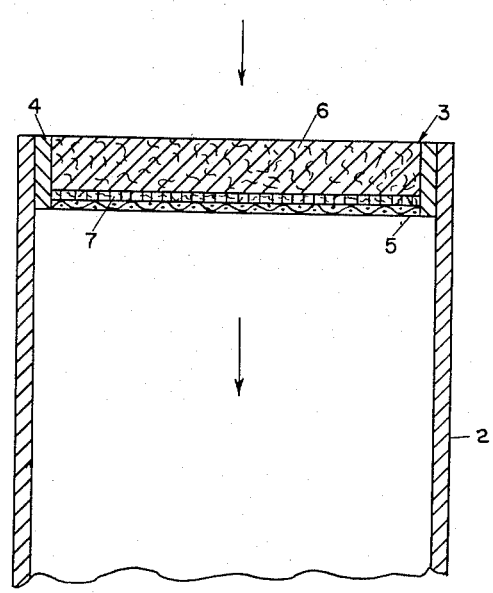
INVENTOR.
Rienzi B. Parker, Jr
BY Herman Seid
atty.

United States Patent Office 2,835,341
Patented May 20, 1958

2,835,341

FILTER CONSTRUCTION

Rienzi B. Parker, Jr., Concord, Mass., assignor to Arthur D. Little, Inc., Cambridge, Mass., a corporation of Massachusetts Application October 25, 1954, Serial No. 464,351

7 Claims. (Cl. 183—69)

This invention relates to a filter for removing dust and dirt particles from a gas and more particularly to a filter composed of glass fibers, the filter being reinforced to prevent local compression thereof which adversely affects its filtering characteristics.

Heretofore, it has been common practice to employ a filter which includes a soft mat which is normally held in place and supported against gas flow by a coarse wire mesh or similar open material on the downstream side of the mat. A fine wire mesh is expensive and is not practicable since it is not sufficiently rigid to provide adequate support. I have found that in use the air pressure imposed upon the filtering medium tends to force it to a limited extent between the wires of the mesh. The uneven force so exerted on the filtering medium causes local compression of the medium thus adversely affecting its filtering characteristics and increasing flow resistance of a gas through the filter with a consequent reduction in the life of the filter.

The chief object of the present invention is to provide a filter so reinforced or supported that the disadvantages heretofore discussed are obviated.

An object of the invention is to provide a filter which includes a layer of soft filtering material of substantial depth and a reinforcing layer in contact with the filtering layer throughout its area, the reinforcing layer consisting of a thin, porous, relatively stiff, fibrous mat.

A further object is to provide a filter composed of entangled glass fibers which is reinforced to prevent local compression thereof by pressure of a gaseous medium passing therethrough. Other objects will be readily perceived from the following description.

This invention relates to a filter including a layer of soft filtering medium of substantial depth and a reinforcing layer in contact with the first layer throughout its area, the reinforcing layer comprising a thin, porous, relatively stiff, fibrous material.

The attached drawing illustrates the filter of the present invention in use in a duct through which a stream of air or other fluid is directed.

Referring to the drawing, there is shown a duct 2 in which the filter 3 of the present invention is placed, the arrows indicating direction of air flow through the filter. The filter generally is placed in a frame 4 which is secured in place in duct 2. It will be appreciated that the filter may be retained in place within the duct in any suitable manner, since the manner in which the filter is retained in the duct is not part of the present invention.

The base of frame 2 comprises a wire mesh screen or series of rods or wires 5 which may be secured to frame 4 in any suitable manner. The filter is supported upon wire mesh 5 in use.

Filter 3 includes a layer 6 of soft filtering material of substantial depth. Preferably layer 6 is formed of entangled glass fibers impregnated by a suitable binder in an amount of about 10% by weight.

Layer 6 is reinforced by a second layer 7 which is in contact with the first layer throughout its bottom area. Preferably layer 7 comprises a thin, porous, fibrous mat of entangled glass fibers not greater than about $\frac{1}{32}''$ in thickness. The reinforcing layer is relatively stiff as compared to the soft filtering material. This reinforcing layer may consist of a material such as "Coromat 20" manufactured by Owens Corning Fiberglas Co. of Toledo, Ohio, which comprises entangled glass fibers heavily impregnated by a resin to impart stiffness to the material without interfering with flow of air therethrough. The reinforcing layer 7 may be secured to layer 6 of filtering medium in any desired manner. Preferably the two layers are adhesively attached to each other. If desired, a very fine screen or a stiffened fabric may be substituted for layer 7.

Placing this reinforcing layer 7 between the soft filtering medium 6 and the wire mesh screen 5 obviates difficulties previously encountered, since the even distribution of force on the downstream side of the filtering medium prevents local compression.

While I have described the reinforcing layer as being adhesively secured to the filtering layer, it will be appreciated it is not necessary to attach these layers to each other. For ease of handling it will be appreciated it is desirable to attach the layers to one another.

While I have described reinforcing layer 7 as being composed of a separate layer adhesively attached to the filtering layer 6, it will be appreciated similar results may be obtained by impregnating to a limited depth the downstream side of the filtering layer by a suitable resin. It is essential, however, that only a minor portion of the filtering medium be impregnated to impart stiffness thereto and to avoid closing the openings in the filtering material which would increase resistance to flow of air through the filtering medium.

I have measured the pressure drop of air flowing through the filtering medium when the filtering medium is provided with a reinforcing layer and when the reinforcing layer is omitted, in both cases the filtering medium being supported by wire mesh. As an illustration, the pressure drop of the filtering medium at a predetermined air flow rate was 0.37 inch of water pressure whereas the total pressure drop through the filter was reduced to 0.33 inch of water when the reinforcing layer was provided.

It will be understood that the present invention provides a filter which is reinforced to prevent local compression caused by passage of air therethrough when the filtering material is supported on a wire mesh base. The reinforcing layer may be provided readily and does not increase to any substantial extent the cost of the filter.

While I have described a preferred embodiment of the invention, it will be understood the invention is not limited thereto since it may be otherwise embodied within the scope of the following claims.

I claim:

1. A filter which comprises a layer of soft filtering medium of substantial depth and a non-filtering reinforcing layer in contact with the first layer throughout its area, the reinforcing layer being porous for relatively free flow of air therethrough as compared to said first named layer comprising a thin, relatively stiff, material, said reinforcing layer acting to protect said soft filtering medium from local compression when the filter bears against and is supported on a wire mesh base.

2. A filter comprising a layer of soft filtering medium of substantial depth and a non-filtering reinforcing layer in contact with the first layer throughout its area, the reinforcing layer being porous for relatively free flow of air therethrough as compared to said first named layer comprising a thin, relatively stiff, material formed of entangled glass fibers, said reinforcing layer acting to protect said soft filtering medium from local compression when the filter bears against and is supported on a wire mesh base.

3. A filter according to claim 2 in which the reinforcing layer is not greater than about 1/32" in thickness.

4. A filter which comprises a first layer of soft filtering medium of substantial depth formed of entangled glass fibers having a resinous binder, and a non-filtering reinforcing layer in contact with the first layer throughout its area, the reinforcing layer being porous for relatively free flow of air therethrough as compared to said first named layer comprising a thin, relatively stiff, fibrous material, said reinforcing layer acting to protect said soft filtering medium from local compression when the filter bears against and is supported on a wire mesh base.

5. A filter according to claim 4 in which the reinforcing layer is formed of entangled glass fibers held together by a resinous binder and having a thickness not greater than about 1/32".

6. A filter which comprises soft filtering medium of substantial depth formed of entangled glass fibers having a resinous binder and a porous non-filtering reinforcing layer affording relatively free flow of air therethrough of less depth than the first layer, in contact with the filtering medium throughout its area, said reinforcing layer acting to protect said soft filtering medium from local compression when the filter bears against and is supported on a wire mesh base.

7. In combination with a duct forming a passageway for the passage of air therethrough, a filter extending across the passageway to filter dust and dirt particles from the fluid directed through the passageway, said filter including a wire screen supporting base, a layer of soft filtering medium of substantial depth, and a porous reinforcing non-filtering layer in contact with the first layer throughout its area comprising a relatively stiff thin mat, the reinforcing layer being interposed between the first layer and the base and serving to prevent local compression of the filtering medium upon passage of air therethrough toward said base.

References Cited in the file of this patent

UNITED STATES PATENTS

| | | |
|---|---|---|
| 2,077,951 | Myers | Apr. 20, 1937 |
| 2,137,246 | Myers | Nov. 22, 1938 |
| 2,546,230 | Modigliani | Mar. 27, 1951 |
| 2,692,654 | Pryor | Oct. 26, 1954 |